(12) United States Patent
Cook (10) Patent No.: US 9,010,140 B2
(45) Date of Patent: Apr. 21, 2015

(54) VEHICLE IDLE TIME REDUCTION SYSTEM AND METHOD

(71) Applicant: Jonathan W. Cook, Tallahassee, FL (US)

(72) Inventor: Jonathan W. Cook, Tallahassee, FL (US)

(73) Assignee: City of Tallahassee, Tallahassee, FL (US)

( * ) Notice: Subject to any disclaimer, the term of this patent is extended or adjusted under 35 U.S.C. 154(b) by 337 days.

(21) Appl. No.: 13/768,171

(22) Filed: Feb. 15, 2013

(65) Prior Publication Data

US 2014/0230470 A1 Aug. 21, 2014

(51) Int. Cl.
*F25B 27/00* (2006.01)
*B60H 1/00* (2006.01)
*B60H 1/32* (2006.01)

(52) U.S. Cl.
CPC .......... *B60H 1/00428* (2013.01); *B60H 1/3222* (2013.01)

(58) Field of Classification Search
CPC .... F25B 27/00; B60H 1/3222; B60H 1/00371
USPC ............................................ 62/118, 236, 244
See application file for complete search history.

(56) References Cited

U.S. PATENT DOCUMENTS

| 2007/0175230 A1* | 8/2007 | Plummer et al. ................. 62/236 |
| 2009/0178421 A1* | 7/2009 | Yeh .................................. 62/132 |
| 2009/0314019 A1* | 12/2009 | Fujimoto et al. ............. 62/228.5 |

* cited by examiner

*Primary Examiner* — Melvin Jones
(74) *Attorney, Agent, or Firm* — J. Wiley Horton (57) ABSTRACT

A system for reducing idle time in service vehicles such as police patrol cars. A bank of auxiliary batteries is provided. An electrically-powered auxiliary air conditioning compressor is also provided. The auxiliary air compressor is connected to the discharge and suction lines of an existing an conditioning system so that it can propel refrigerant through an existing refrigerant circulation loop. When the vehicle's internal combustion engine is switched off, the auxiliary batteries are selectively used to power the auxiliary air-conditioning compressor in order to provide cooling for the vehicle's cabin. The auxiliary batteries are also used to provide electricity to the vehicle's other electrical loads—such as emergency lights.

20 Claims, 6 Drawing Sheets

VEHICLE IDLE TIME REDUCTION SYSTEM AND METHOD

CROSS-REFERENCES TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of motor vehicles. More specifically, the invention comprises a system and method for reducing the idle time of an internal combustion engine by allowing certain loads that are customarily carried by the engine to be selectively transferred to the vehicle's electrical system.

2. Description of the Related Art

Motor vehicles generally include two interlinked energy systems. These are: (1) the internal combustion engine that is used to propel the vehicle; and (2) the electrical system that is used to provide energy to electrical components such as lights, blower motors, and communication equipment. The electrical system generally includes an alternator and at least one storage battery. The alternator converts some of the mechanical energy produced by the internal combustion engine to electrical energy that is either used immediately or stored in the battery.

The inclusion of the storage battery allows certain electrical devices to remain active even when the internal combustion engine is not running. For example, the vehicle's radio and interior lights may be run for a substantial length of time (up to several hours) by drawing energy stored in the battery. For most vehicles, a fairly limited amount of storage capacity will suffice. This is true because the electrical systems are not used thr extended periods of time when the motor is not running. Most users enter a motor vehicle with the intention of driving somewhere. Thus, most prior art motor vehicles have only a limited capacity for operating the electrical systems when the internal combustion engine is not running.

The situation is quite different for service vehicles such as police patrol cars. A police patrol car includes significantly more electrical components than a typical motor vehicle. For example, a police cruiser includes a high-intensity light bar on its roof. In addition, a cruiser includes one or more two-way communication radios that are almost always switched on. The electrical energy consumed by these components is much greater than for a typical car.

In addition, many electrical components of a police cruiser are routinely in use while the car is stationary. For example, a police car parked at a vehicle accident scene typically runs its emergency lights, its radios, and an internal computer system.

An even more significant problem exists in warmer climates. Pace officers must often remain within a parked patrol car for extended periods of time (up to and including several hours). When high ambient temperatures are present, the patrol car becomes unbearably hot. The solution to this problem is to leave the internal combustion engine running so that the alternator can carry the electrical load and the mechanically-driven air conditioner compressor can drive the vehicle air conditioner.

Police patrol cars are configured to remain stationary with the engine at idle speed for several hours. Electrically-driven cooling fans force air over the vehicle's radiator so that it does not overheat. In addition, supplemental idle speed control systems may be provided to "kick up" the idle speed in order to provide sufficient charging current from the alternator and sufficient rotational speed for the air conditioner compressor.

While these systems function, they are not very efficient. A typical police patrol car sits at idle for several hours each day. This process wastes fuel and produces additional exhaust products. In addition, the prolonged idling of the internal combustion engine reduces the engine life available for its primary purpose—moving the vehicle. The use of an idling internal combustion engine is in fact quite inefficient for driving the moderate electrical load (via the alternator) and the moderate mechanical load (the air conditioning compressor).

The inefficiency results from the fact that an internal combustion engine having considerable capacity (around 300 horsepower, or 224 kW) is being used to drive a relatively small load (around 10 horsepower, or 22 kW). As those skilled in the art will know, internal combustion engines are inefficient when operating near the bottom of the range of available capacity.

It would therefore be preferable to provide a system which is able to carry the electrical and mechanical loads for a stationary service vehicle without the use of the internal combustion engine that drives the vehicle. The present invention provides such a solution.

BRIEF SUMMARY OF THE PRESENT INVENTION

The present invention comprises a system for reducing idle time in service vehicles such as police patrol cars. A bank of auxiliary batteries is provided. An electrically-powered auxiliary air conditioning compressor is also provided. The auxiliary air compressor is connected to the discharge and suction lines of an existing air conditioning system so that it can propel refrigerant through an existing refrigerant circulation loop. When the vehicle's internal combustion engine is switched off, the auxiliary batteries are selectively used to power the auxiliary air-conditioning compressor in order to provide cooling for the vehicle's cabin. The auxiliary batteries are also used to provide electricity to the vehicle's other electrical loads—such as emergency lights.

An integrated control system is preferably provided. This system allows a user to set a desired cabin temperature. It also advises the user to start the internal combustion engine when the auxiliary batteries need to be recharged. A battery isolation system is preferably included so that a battery or batteries used to start the patrol car will not be discharged during the time period when the internal combustion engine is switched off.

| REFERENCE NUMERALS IN THE DRAWINGS | | | |
|---|---|---|---|
| 10 | split charging system | 12 | main battery |
| 14 | first auxiliary battery | 16 | second auxiliary battery |
| 18 | third auxiliary battery | 20 | alternator |
| 21 | B+ input | 22 | B+ lead |
| 24 | isolator | 26 | circuit breaker |
| 28 | circuit breaker | 30 | starter |
| 32 | emergency lights | 34 | auxiliary compressor motor |
| 36 | radio | 38 | computer |
| 40 | Batt1 post | 42 | Batt2 post |
| 44 | B+ post | 46 | E lead |
| 48 | positive rail | 50 | negative rail |
| 51 | police cruiser | 52 | auxiliary compressor |
| 54 | auxiliary batteries | 56 | main compressor |
| 57 | L.I.T. compressor | 58 | climate control system |
| 59 | first split | 60 | second split |
| 62 | first flow control valve | 64 | second flow control valve |
| 65 | third flow control valve | 66 | main discharge line |
| 68 | condenser | 70 | receiver/drier |
| 72 | expansion valve | 74 | evaporator |
| 76 | main suction line | 78 | auxiliary suction line |
| 80 | auxiliary discharge line | 82 | auxiliary control panel |
| 84 | car climate controller | 86 | blower motor |
| 88 | clutch controller | 90 | power button |
| 92 | fan control | 94 | temperature control |
| 96 | temperature display | 100 | fourth auxiliary battery |

DETAILED DESCRIPTION OF THE INVENTION

Figure 1:
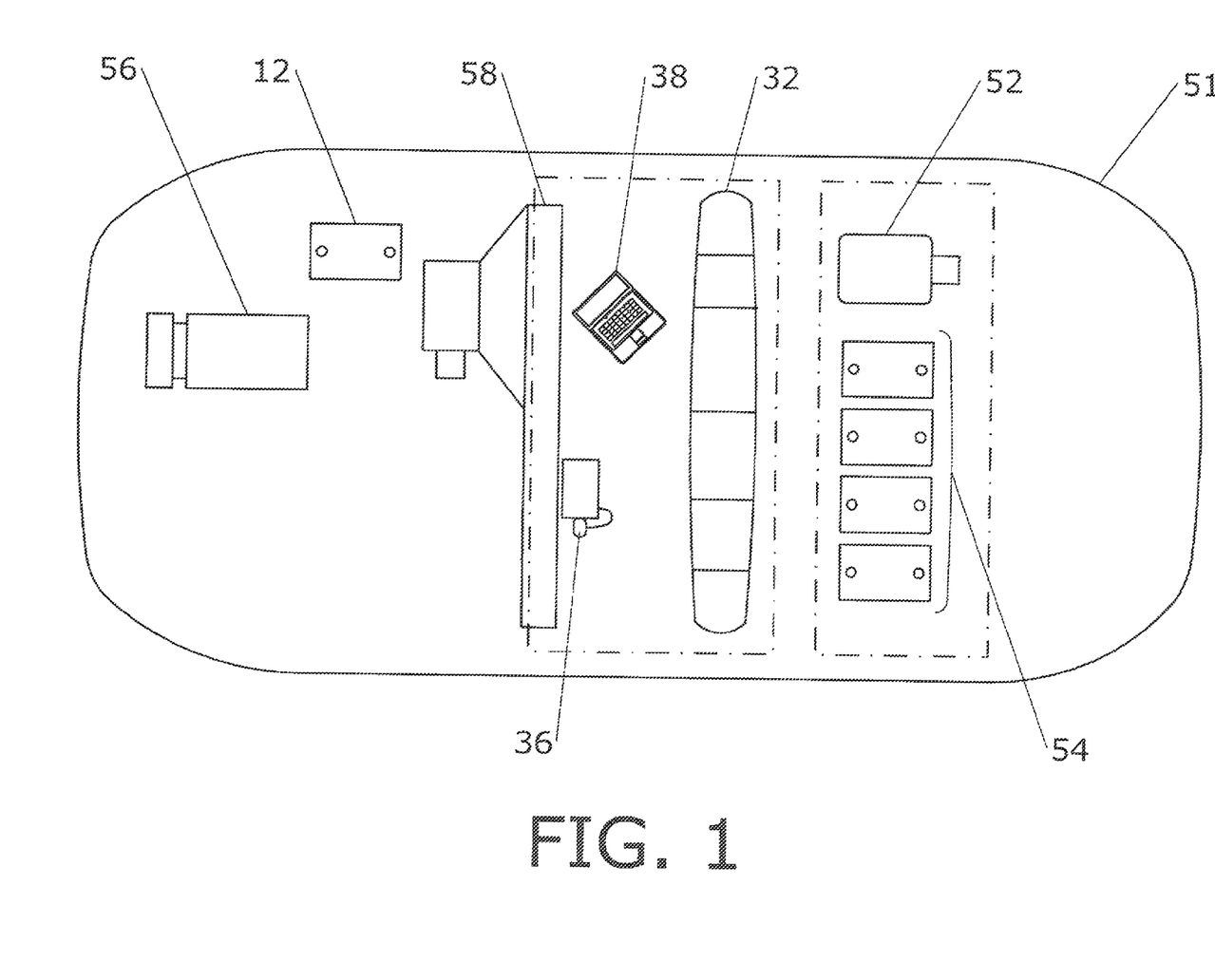
FIG. 1 is a schematic plan view, showing approximate locations for the components used in the present invention.

FIG. 1 shows a very simplified plan view of a representative service vehicle—police cruiser 51. The components of the present invention may be located in many different parts of the vehicle. FIG. 1 shows one potential arrangement. Main compressor 56 is located in the engine bay, typically being directly attached to the internal combustion engine. It is mechanically driven by a belt—often a single serpentine belt—that receives torque from the main crankshaft pulley.

Main battery 12 is used primarily to start the internal combustion engine. It is common to mount main battery 12 in the engine compartment. Climate control system 58 typically spans a vehicle's firewall—with some components being in front of the firewall and some lying within the passenger cabin. This is not always the case, however. In some vehicles, this system lies entirely within the cabin. The climate control system typically includes a heater matrix, an air conditioning evaporator coil, a condensation collector, a blower, and various control components (such as a thermostat and flow-directing air gates).

A few significant electrical loads are illustrated, including emergency lights 32, radio 36, and computer 38. A typical police cruiser includes many more electrical loads and the ones illustrated should properly be viewed as exemplary.

The present invention adds several new components, and potential locations for some of these new components have been illustrated in FIG. 1 as well. Auxiliary batteries 54 are located in the trunk in the embodiment shown. Auxiliary compressor 52 is also located in the trunk. These components may be added in any suitable location. However, because they occupy a significant amount of space, the trunk is generally the best location.

The present invention is able to circulate refrigerant within the air conditioning system by selectively using main compressor 56, auxiliary compressor 52, or potentially both compressors. Auxiliary compressor 52 is driven by electrical power rather than a mechanical drive belt. It will generally draw electrical energy from auxiliary batteries 54. The concept is to use the auxiliary batteries to meet both the electrical needs and the air conditioning needs of the vehicle while the vehicle is parked and its internal combustion engine is switched off.

Those skilled in the art will realize that the use of the auxiliary batteries to drive the vehicle's electrical systems poses a risk. As electrical energy is withdrawn from the batteries the voltage available will drop lower and lower. If this continues for too long, the vehicle voltage may fall below the level needed to actuate the engine starter. The batteries are recharged via the engine's alternator. Thus, if the engine cannot be restarted, an external power source will be needed in order to continue operations.

Figure 2:
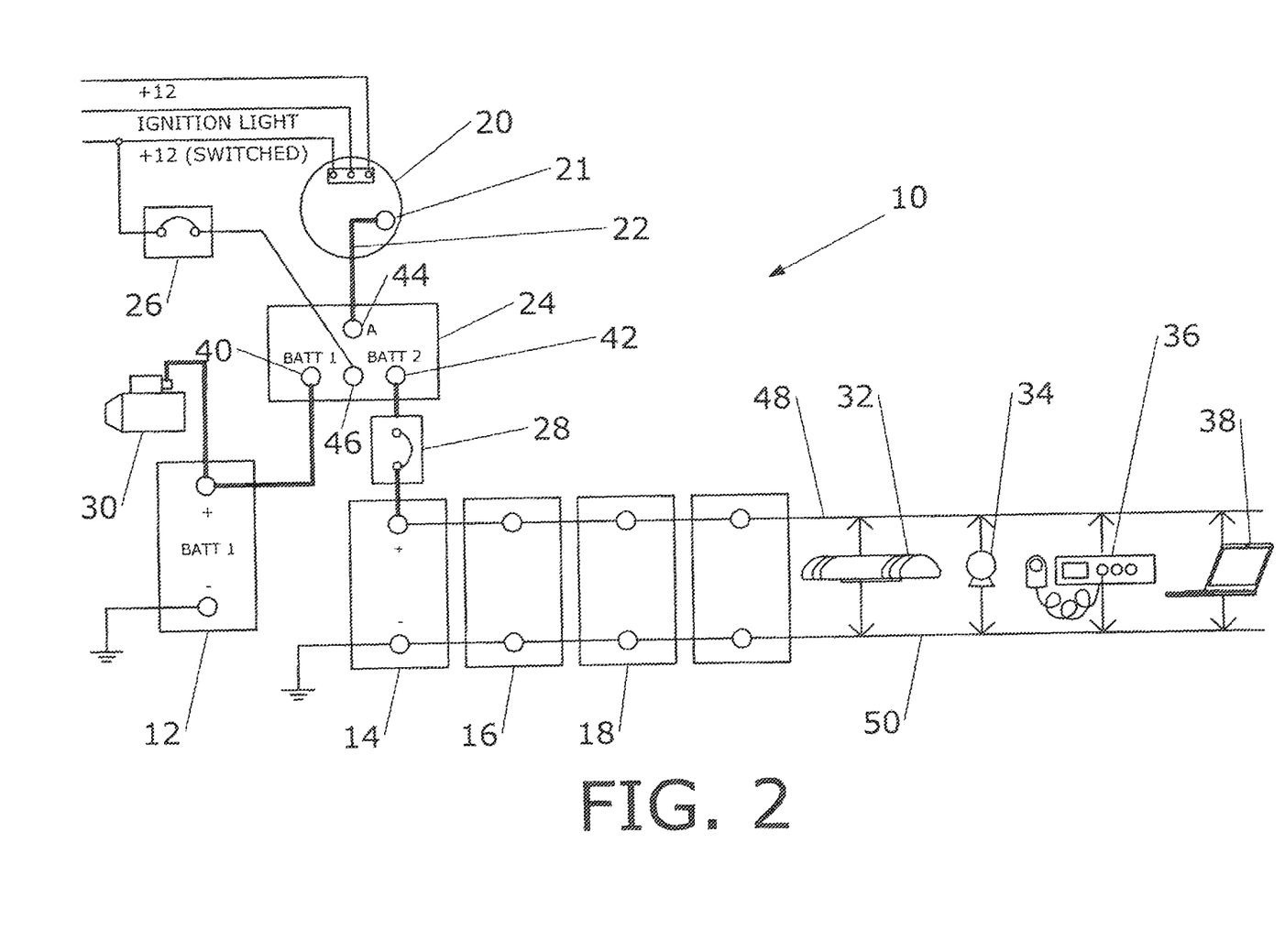
FIG. 2 is an electrical schematic, showing the use of a split charging system incorporating an isolator.

One solution to this problem is the provision of a split charging system in which one battery is held "in reserve" solely for the purpose of starting the vehicle's internal combustion engines. The other batteries may then be drawn down considerably without the fear of losing the ability to restart the vehicle. There are many different ways to provide a split charging system, FIG. 2 shows one embodiment of such a system.

Most modern alternators include an internal voltage regulator. This device switches the output of the alternator on and off as the system loads require. In such a system, B+ lead 22 is generally connected from the positive post of main battery 12 to B+ input 21 on alternator 20. In order to provide the desired battery isolation, isolator 24 has been inserted between the positive post of the main battery and B+ input 21.

Those skilled in the art will know that battery isolators are installed in different ways according to the configuration of the charging system in the vehicle. The charging system shown in FIG. 2 is a common "3-lead" system in which the alternator includes 3 connections in addition to the B+ input. The additional connections are +12V (full time), +12V (switched), and the "ignition light" lead (which is used to indicate an alternator fault on the vehicle instrument display).

The particular isolator 24 shown has four separate connections. It serves to isolate main battery 12 from a parallel array of auxiliary batteries. In this example, four auxiliary batteries are used (first auxiliary battery 14, second auxiliary battery 16, third auxiliary battery 18, and fourth auxiliary battery 100). The array of auxiliary batteries provides power to all the vehicle's electrical systems except starter 30. The power will be provided through an array of fuses or circuit breakers. The distribution of power is shown simplistically in the view as positive rail 48 and negative rail 50. The various electrical loads are shown as connecting these rails.

In reality the "negative rail" is typically the vehicle's chassis and the "positive rail" will include a fused wiring harness with individual conductors reaching the desired locations. The depiction of a positive and negative rail with loads spanning these rails is typical for vehicle wiring diagrams, as those skilled in the art will know.

The auxiliary batteries are connected to Batt2 post 42 on isolator 24. B+ lead 44 on the isolator is connected to B+ input 21 on the alternator. The isolator also includes a control lead input. This input, designated as "E lead" 46, is connected to a switched +12V line (usually the one leading to the alternator).

It is advisable to include fuses or circuit breakers on some of the connections. For example, circuit breaker 28 is preferably provided in the high-current connection between Batt2 post 42 and positive rail 48. Circuit breaker 26 is preferably provided on the E lead.

When the internal combustion engine driving alternator 20 is running, the alternator output is switched between the two battery circuits by isolator 24. For example—just after starting the engine—the isolator will likely switch the alternator output to main battery 12 to replenish the energy used by the starter motor. Thereafter, the alternator output will be switched to the auxiliary battery bank.

The isolator is preferably a solid state device capable of rapid switching (such as by the use of internal power transistors). Such devices may switch many times in a single second. Thus, it is not typically a situation where main battery 12 is charged for several minutes while the auxiliary bank receives no charging. It is preferable to use a "duty cycle" arrangement where both the main battery and the auxiliary batteries receive alternator input once every few milliseconds.

The isolator monitors the charge on both the main battery and the auxiliary battery bank and makes sure that both are properly charged when the alternator is running. The operation of such an isolator is generally "invisible" to the battery.

Of course, one of the main benefits of an isolator occurs when the internal combustion engine is shut down. When this occurs, isolator 24 separates all the electrical loads (emergency lights, radio, etc.) from main battery 12. Thus, even if the auxiliary battery bank is thoroughly depleted, isolator 24 can bring main battery 12 on-line for energizing starter 30. And, the main battery is not connected in parallel with the auxiliary batteries for the starter actuation. It is completely isolated.

The reader will thereby appreciate how the system of FIG. 2 allows the isolated charging of two separate battery systems. In addition, the system of FIG. 2 ensures that a user cannot deplete the battery needed to start the internal combustion engine by running electrical loads when the engine is switched off.

The ratio of four auxiliary batteries to one main battery is typical for the inventive system. The use of the isolator allows the use of different battery types. For example, main battery 12 might be a "shallow cycle" battery intended to provide relatively little energy storage but high current delivery. On the other hand, the auxiliary batteries could be "deep cycle" batteries having a much larger storage capacity. The auxiliary batteries may even have a different voltage. For instance, each auxiliary battery might be a 6V type or a 24V type.

It is generally inadvisable to connect in parallel batteries of different type—as such batteries will accept charging current at differing rates. However, the use of the isolator means that the main battery is never in fact connected in parallel with the auxiliary batteries. It is therefore possible to use batteries optimized for the different functions needed (starting power versus storage capacity).

It is preferable to provide a large-capacity alternator in order to ensure that an appropriate charge level can be maintained during the amount of engine run-time available. A typical 60 or 80 amp alternator will not suffice for this purpose. It is preferable to provide an alternator having a 150 to 200 amp output.

The split charging system shown in FIG. 2 is sufficient to allow a service vehicle's electrical system to run for an extended period (1-3 hours) while the engine is shut down. However, additional components are needed to provide air conditioning during these periods. These additional components are shown in FIGS. 3A to 3C.

Figure 3A:
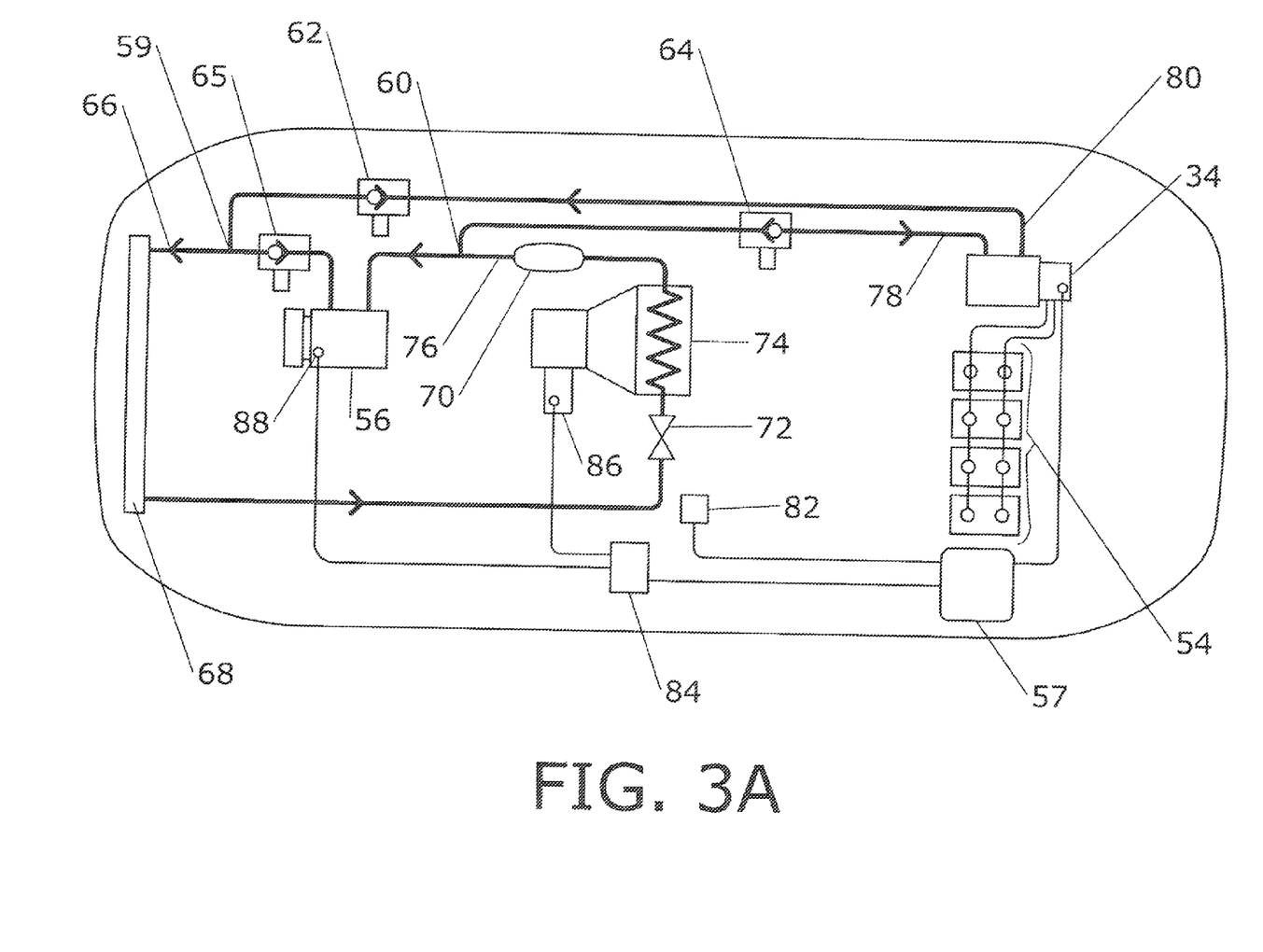
FIG. 3A is a schematic plan view, showing the refrigerant circulation loops used in the present invention.
Figure 3B:
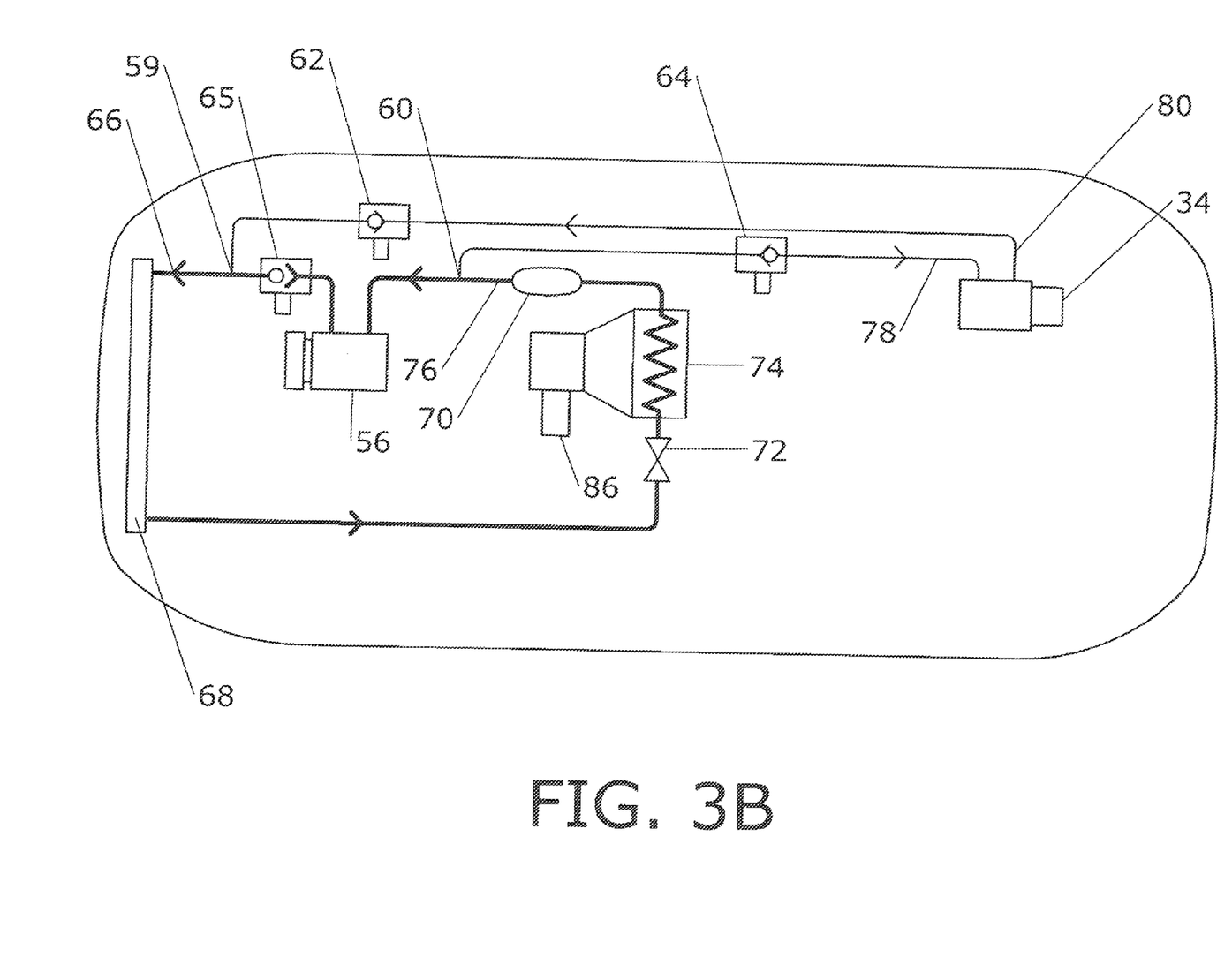
FIG. 3B is a schematic plan view, showing the main refrigerant circulation loop in operation.
Figure 3C:
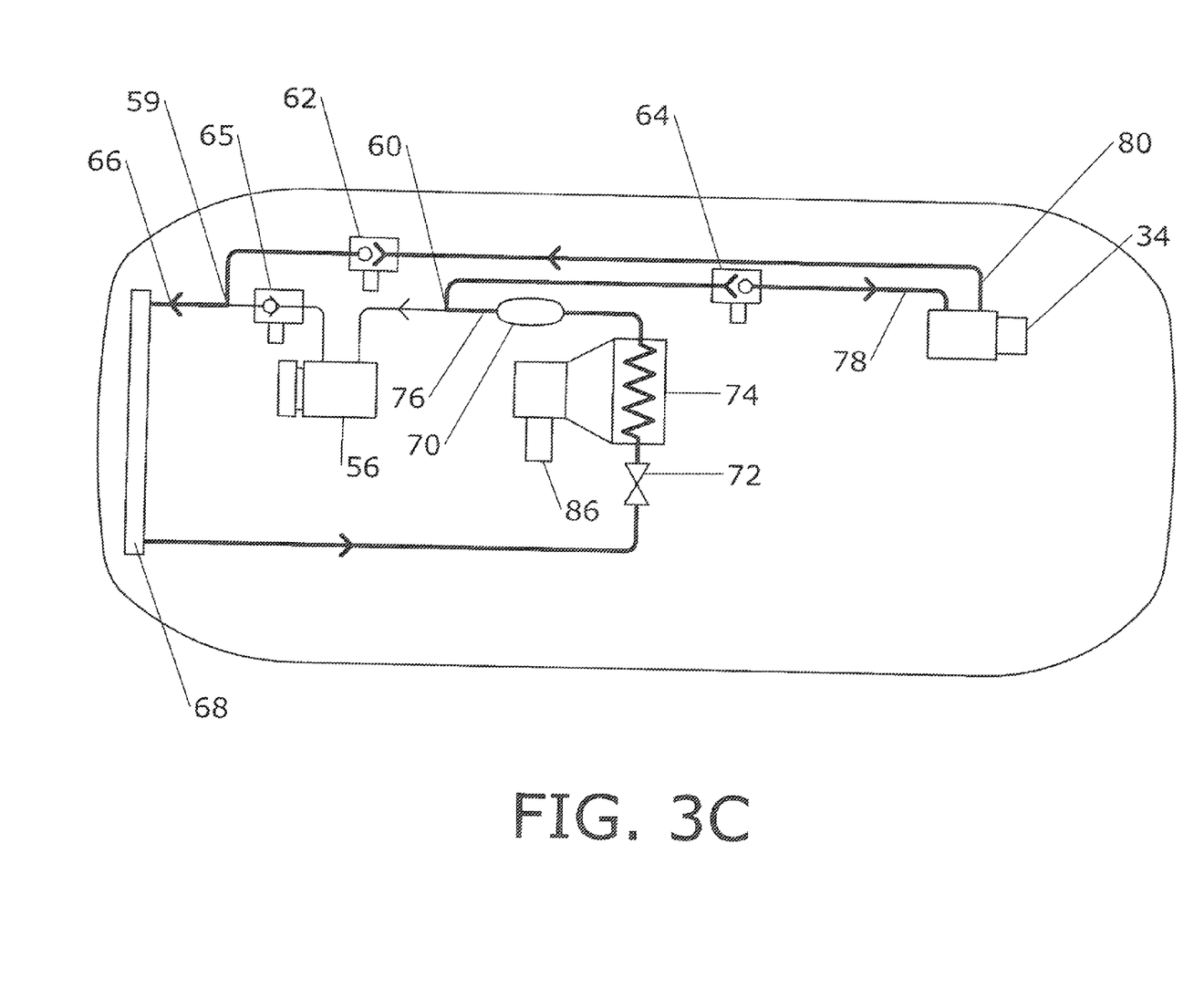
FIG. 3C is a schematic plan view, showing the auxiliary refrigerant circulation loop in operation.

In the embodiment shown in FIGS. 3A to 3C, the additional components interact with a conventional prior art air conditioning system. Though the prior art system is well known to those skilled in the art, it may benefit the reader's understanding to have a brief explanation. A conventional refrigeration circulation loop is present. This conventional loop encompasses main compressor 56, condenser 68, expansion valve 72, evaporator 74, and receiver/drier 70.

Main compressor 56 is driven by a belt connected to the engine's crankshaft pulley. It pulls in gaseous refrigerant through main suction line 76. The compressor then compresses the gaseous refrigerant to form a hot, compressed gas. The hot, compressed gas is fed into condenser 68 via main discharge line 66. The condenser cools the hot gas so that it condenses into a liquid. The pressurized and cooled liquid then passes to expansion valve 72.

The pressurized liquid flashes to a gas as it expands through expansion valve 72. The expanding gas circulates through evaporator 74. This phase change of the refrigerant from a liquid to a gas results in a dramatic reduction in temperature. The refrigerant gas flowing through evaporator 74 is therefore quite cold.

The evaporator is contained within a housing. It generally includes a serpentine flow path of the refrigerant within a sealed tube. The serpentine tube is joined to a number of external fins to form an assembly that resembles a small radiator. Blower motor 86 forces air over the evaporator. The air is thereby cooled. The cooled air is then blow into the cabin of police cruiser 51 to provide air conditioning.

A portion of the water vapor contained in the air blown over the evaporator will condense on the evaporator and run downward under the influence of gravity. This water is collected and expelled from the vehicle. Thus, the air conditioning system performs both a cooling and dehumidifying function.

The gaseous refrigerant flowing through the evaporator is heated by the passing air. The refrigerant next passes to receiver/drier 70. The receiver/drier removes water vapor circulating in the system. The gaseous refrigerant exiting the receiver/drier is then returned to main compressor 56 via main suction line 76. The refrigerant continues to circulate within the closed loop as long as main compressor 56 is running. Such systems are generally referred to as having a "high pressure side" and a "low pressure side." The high pressure side starts with the discharge side of main compressor 56 and extends around the loop until expansion valve 72. The low pressure side starts at expansion valve 72 and extends around the loop back to main compressor 56.

The prior art air conditioning system works quite well, but it is wholly dependent upon mechanical power being supplied to main compressor 56 via the vehicle's internal combustion engine. When the engine is turned off, it is still possible to run blower motor 86, but no cooling effect is created because no refrigerant is circulating. The present invention solves this problem by providing a second, electrically-driven compressor.

In the embodiment of FIG. 3A, auxiliary compressor 52 is located in the vehicle's trunk. Auxiliary compressor motor 34 provides rotational energy to auxiliary compressor 52. Electrical power is selectively applied to auxiliary compressor motor 34 by auxiliary batteries 54.

The auxiliary compressor is preferably added to the existing air conditioning system in a way that utilizes the existing refrigerant circulation loop. However, control valves are preferably added so that the flow of refrigerant may be directed to either main compressor 56 or auxiliary compressor 52. While it is possible to run both compressors at the same time, the preferred method is to operate only one compressor at a time. When the internal combustion engine is operating, refrigerant is circulated by main compressor 56. When the internal combustion engine is switched off, refrigerant is circulated via auxiliary compressor 52.

In order to provide a selected circulation path for the refrigerant, first control valve 62, second control valve 64, and third control valve 65 are provided. These may be simple check valves. In fact, check valves are the preferred embodiment. Alternatively, they may be electrically-controlled valves under the operation of a central control system (described subsequently). First control valve 62 controls flow in auxiliary discharge line 80, which connects the discharge side of auxiliary compressor 52 to first split 59 (first split 59 being a junction, such as a "tee" that connects auxiliary discharge line 80 to main discharge line 66). Second flow control valve 64 controls flow in auxiliary suction line 78, which connects the suction side of auxiliary compressor 52 to second split 60 (second split 60 being a junction, such as a "tee" that connects auxiliary suction line 78 to main suction line 76). Third flow control valve 65 is used to prevent unwanted backflow through main compressor 56 when auxiliary compressor 52 is operating. In FIG. 3A, all the flow control valves are shown in an open state. This is for purposes of illustration only. In the preferred states of operation, some of the flow control valves will be closed.

FIG. 3B shows the state of the system when the internal combustion engine is running (and main compressor 56 is therefore in operation), first flow control valve 62 and second flow control valve 64 are closed. Third flow control valve 65 is open. The refrigerant then flows in a loop through main compressor 56, condenser 68, expansion valve 72, evaporator 74, receiver/drier 70, and back through main suction line 76 to main compressor 56. Refrigerant is circulating in the portion designated by the bold lines. Refrigerant is no circulating through the portions designated by the normal lines.

Those skilled in the art will realize how the system can function well using simple check valves as the flow control valves. A check valve is often just a ball which is held away from a valve seat by a spring. Pressure applied to the valve on the ball side will close the valve. Likewise, suction applied to the valve on the seat side will also close the valve. When main compressor 56 runs, it produces high pressure on its discharge side and suction on the opposite side. The high pressure on the discharge side blows open a check valve used as third flow control valve 65. The same high pressure is applied via first split 59 to first flow control valve 62. If a simple check valve is used as first flow control valve 62, then high pressure "pushes" the check valve closed.

The compressor also applies suction to main suction line 76. This suction is applied via second split 60 to second flow control valve 64. If a simple check valve is used in this location, the suction will "pull" it closed as shown. Thus, the system will operate using simple passive check valves instead of a positively-controlled valve.

FIG. 3C shows the state of the system when the internal combustion engine is switched off and air conditioning is desired. Main compressor 56 does not run. Instead, auxiliary compressor 52 is activated. First and second flow control valves 62, 64 are opened. Third flow control valve 65 is closed. A revised refrigerant circulation loop is thereby created, and this loop is shown in bold in FIG. 3C. The refrigerant flows from auxiliary compressor 34, through auxiliary discharge line 80, past first flow control valve 62, through first split 59 (flowing toward the condenser as the opposite direction is blocked by third flow control valve 65), through condenser 68, through expansion valve 72, through evaporator 74, through receiver/drier 70, through second split 60 (flowing toward the auxiliary compressor as the opposite direction is blocked), past second flow control valve 64, through auxiliary suction line 78, and back to auxiliary compressor 52.

Flow control valves 62, 64, 65 may be positively controlled using a solenoid or other device to positively open and close them. Those skilled in the art will again realize that simple check valves can be used. When the auxiliary compressor runs, it creates high pressure in auxiliary discharge line 80. This high pressure "pushes" open a check valve used as first flow control valve 62. The high pressure is applied to first split 59. This pressure then pushes closed a check valve used as third flow control valve 65 (thereby preventing backflow through the stationary main compressor). The suction side of the auxiliary compressor applies suction to auxiliary suction line 78. This suction "pulls" open a simple check valve used for second flow control valve 64.

Some compressors represent a complete obstruction to flow when not spinning. If such a compressor is used, it is possible to operate the circuit shown in FIG. 3C without third flow control valve 65. However, most compressors do allow some amount of back flow even when stationary. For this reason, the use of third flow control valve 65 is preferred.

Air conditioning compressors pump gaseous refrigerant. They do not need to be "primed." It is therefore possible to switch frequently between the two modes of operation (main compressor versus auxiliary compressor) without any significant interruption in cooling capacity.

It is possible to manually control all the components shown in FIG. 3. However, automatic control is certainly preferred. The auxiliary air conditioning is preferably part of a larger "low idle time" system that allows the vehicle to operate for extended periods without the need to keep the internal combustion engine running. L.I.T. controller 56 ("low idle time" controller) automates the management of the system.

The L.I.T. controller may interact with the vehicle's existing systems in many different ways. FIG. 3 shows one exemplary approach to integrating the controller. Car climate controller 84 is generally an existing system that controls the temperature in the vehicle's interior. Significantly, it controls blower motor 86 (which forces air over the evaporator or a heater matrix) and clutch controller 88 (which engages and disengages main compressor 56).

Most vehicles now have a thermostatically-controlled air conditioning and heating system. The user sets a desired cabin temperature. Car climate controller 84 then cycles the main compressor on and off to achieve the desired temperature. The car climate controller may actually be modified to include the control of the components added by the present invention. However, it will also be common to retrofit the present invention to existing vehicles. In this case a separate control input may be needed. Auxiliary control panel 82 provides such an input.

Figure 4:
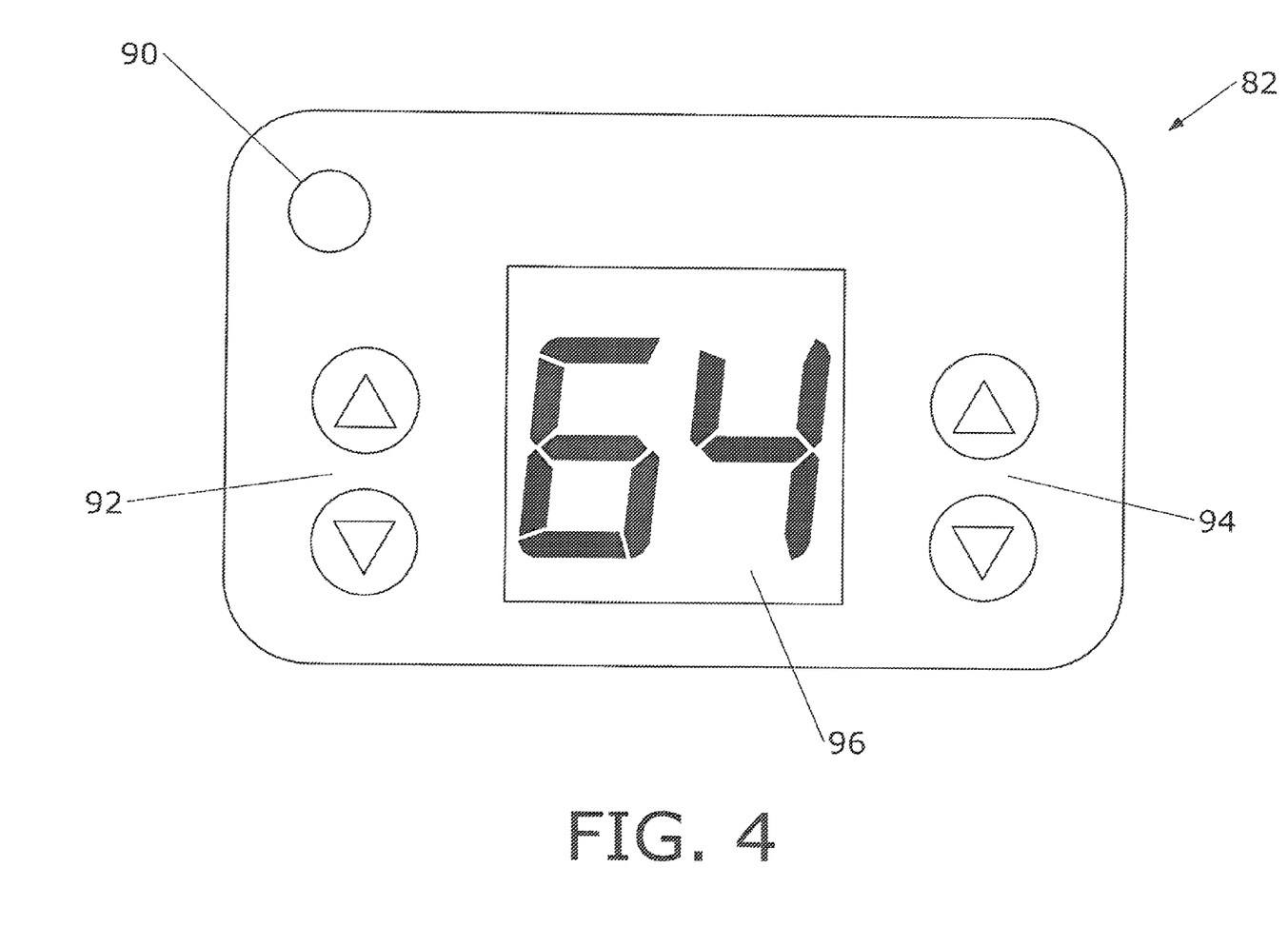
FIG. 4 is an elevation view, showing an auxiliary control panel that may be used to control the present invention.

Auxiliary control panel 82 is shown in FIG. 4. This panel may be mounted on the vehicle's dash or in many other suitable locations. It allows a user to enter a desired cabin temperature when the vehicle's internal combustion engine is not running. In this situation, the vehicle's main electrical system may not be running at all. Power button 90 allows the user to activate the system. Fan control 92 allows the user to increase or decrease the speed of the blower motor. Temperature control 94 allows the user to increase or decrease the desired cabin temperature. The temperature setting is shown in temperature display 96.

Returning now to FIG. 3A, the reader will observe that auxiliary control panel 82 is electrically connected to L.I.T. controller 57. L.I.T. controller 57, in this embodiment, is also connected to auxiliary batteries 54, auxiliary compressor motor 34, car climate controller 84 (and indirectly to blower motor 86 and clutch controller 88). The L.I.T. controller preferably performs multiple functions, including: (1) monitoring the status of auxiliary batteries 54, (2) monitoring the status of all electrical loads on the vehicle, (3) receiving user inputs regarding desired cabin temperature and other things, (4) switching the auxiliary compressor on and off to regulate the cabin temperature, (5) advising the user of the current status of the vehicle electrical system.

In the preferred embodiment, a bank of four auxiliary batteries is used. The main battery used to start the vehicle is of the 12V type. The auxiliary batteries are preferably of the 6V type. In FIG. 3A, the auxiliary batteries are schematically depicted as being connected in a parallel fashion, it is preferable to provide switching circuits so that the auxiliary batteries can be connected in different ways. For example, using four 6V batteries, one can connect all four batteries in series to create 24V. One may also make alternative connections in order to create two groups of two batteries each. Each group of batteries would contain a pair of serially-connected 6V batteries. The two groups are then connected in parallel. The result is that the voltage across each group is nominally 12V (two 6V batteries connected in series). Of course, the voltage across the two groups connected in parallel is also 12V.

Different connection schemes are preferably used for different purposes. When the internal combustion engine is switched off, the auxiliary battery bank is used to power the auxiliary compressor. In this state, the four batteries are connected in series in order to provide 24V to the auxiliary compressor (higher DC voltage generally providing better efficiency). When the internal combustion engine is switched on and the auxiliary compressor is switched off, the system recharges the batteries within the auxiliary battery bank. In this state the batteries are connected to create the aforementioned two parallel 12V groups (each group containing two serially connected 6V batteries). The alternator output is then applied to the two groups to recharge them. Thus, the reader will understand that the connections between the batteries within the bank preferably allow: (1) A 24V output state for driving the auxiliary compressor, (2) A 12V output state for electrical loads other than the auxiliary compressor, and (3) A 12V charge-receiving state. The L.I.T. controller may be configured to automatically switch the battery wiring to create the desired connections for the batteries. States (1) and (2) may exist at the same time by using the appropriate tap points for the voltage supplied.

A brief explanation of a typical "work day" for a vehicle employing the present system will now be provided. Many officers are actually required to drive an assigned patrol vehicle home to the officer's residence at the end of each shift. It typically remains at that residence until the officer returns for the next assigned shift. During the drive home and the return for the next shift, the patrol car's internal combustion engine is operated at normal speeds.

The "work day" in this example occurs in the middle of summer, and air conditioning is typically used as all times. During the drive home and return, the vehicle's high-capacity alternator is typically able to bring both the main battery and the auxiliary batteries up to a full charge. The climate control system is also operated conventionally.

An officer's first assignment might be monitoring traffic during the morning rush hour in order to catch speeders. Once in the proper position, the patrol car is shut down. This action shuts down the vehicle's main compressor and alternator. L.I.T. controller 57 then switches all systems to the auxiliary batteries. The radios, computers, and other electrical systems continue to run. The auxiliary compressor motor is activated and deactivated as necessary to maintain the desired cabin temperature (The lower motor is also activated).

In its simplest form, the L.I.T. controller monitors the dropping voltage within the auxiliary batteries. When the batteries reach a defined low voltage threshold, the system will switch off the auxiliary compressor and blower motor while informing the officer that the vehicle should be started in order to recharge the batteries.

A more sophisticated system might give the officer a "time to restart" display based on the current consumption rate. For a given electrical load, the display might start at "1 hour 50 minutes" and count down. An even more sophisticated system might recommendations, such as "Raising the temperature setting from 74 to 78 will extend the no-idle period for 1 hour."

At some point the internal combustion engine will need to be restarted in order to recharge the auxiliary batteries. The split charging isolator ensures that the main battery is not depleted. There is never a concern about having sufficient energy to restart the vehicle. Once the internal combustion engine is restarted, the car idles and the alternator recharges the battery. The L.I.T. controller preferably remains active in these periods as well. It can let the officer know when sufficient charging has occurred. A more sophisticated version can provide a countdown of time remaining until the vehicle can again be switched off.

The practical experience with this system has shown that little idle time is needed to maintain the desired charge level. Patrol cars must be relocated fairly often. Every time the vehicle moves its alternator recharges the auxiliary batteries.

The L.I.T. preferably includes a computing device running software. In this embodiment, the user may be advised of the current vehicle status and recommendations can be made. Data collected from each vehicle may even be stored and uploaded to external devices for use by supervisory or maintenance personnel.

The reduction in patrol car idle time achieved by the inventive system is significant. Depending on a car's average idle time, the system can save up to $4,000 per year in fuel (based on fuel prices in the range of $3 to $4 per gallon). The system can also eliminate up to 73 pounds of carbon dioxide emissions per day. Depending primarily on the ambient temperature, the system allows operations for one to five hours while the patrol car is stopped with its engine switched off.

The following table shows the available operation time for an exemplary patrol car having LED-based emergency lights (switched on) and a thermostat setting of 66 degrees:

TABLE ONE

| Ambient Temperature | 60 | 70 | 80 | 90 | 100 |
|---|---|---|---|---|---|
| Minutes of Operation | 300+ | 240 | 180 | 120 | 60 |

When the voltage in the auxiliary battery bank falls to a defined level, the L.I.T. controller can provide an alert signal to the vehicle operator in a variety of ways. One simple alert is the shut-down of the auxiliary compressor and air conditioning blower motor. The L.I.T. controller can also (1) flash a "low voltage" message on the auxiliary control panel, (2) illuminate a low voltage warning light on the auxiliary control panel, and/or (3) sound an audible alarm. More sophisticated versions of the L.I.T. controller can even be configured to automatically start the vehicle's internal combustion engine. This feature may be particularly useful when an officer has parked the patrol car with its lights operating, but the officer is located outside the vehicle. Ordinarily an officer would not operate the air conditioning when he or she is not in the vehicle. However, some circumstances (such as K-9 units)

will make the operation of the air conditioning important even when the officer is not in the vehicle.

The L.I.T. controller may also control the three flow control valves. These may be actuated via simple solenoids. On the other hand, the valves could be more-complex globe valves actuated by small servo motors. In the two states of operation, the L.I.T. controller would take the appropriate action. For the condition of the internal combustion engine running, the L.I.T. controller would keep auxiliary compressor 52 idle and close the first and second flow control valves 62, 64.

For the condition of running the air conditioner with the internal combustion engine switched off, the L.I.T. controller would activate auxiliary compressor 52, activate blower motor 86, and open the first and second flow control valves 62, 64. The L.I.T. controller would also close third flow control valve 65. Of course, as explained previously, the flow control valves may be simple check valves that require no positive control.

Although the preceding description contains significant detail, it should not be construed as limiting the scope of the invention but rather as providing illustrations of the preferred embodiments of the invention. Those skilled in the art will know that many other variations are possible without departing from the scope of the invention. For example, it is possible for the L.I.T. controller to control an auxiliary heating module for use during cold weather when the engine is shut down. Accordingly, the scope of the invention should properly be determined with respect to the following claims rather than the examples given.

The invention claimed is:

1. A method of reducing idle-time for a motor vehicle, comprising:
   a. providing a main air-conditioning system for circulating a refrigerant through a main refrigerant loop, said main refrigerant loop including,
      i. a main compressor having a high-pressure side and a low-pressure side, said main compressor being driven by an internal combustion engine in said motor vehicle,
      ii. a condenser,
      iii. an expansion valve,
      iv. an evaporator,
      v. a main discharge line, connecting said high-pressure side of said compressor to said condenser, and
      vi. a main suction line, connecting said low-pressure side of said main compressor to said evaporator;
   b. providing at least one auxiliary battery;
   c. providing an auxiliary compressor having a high-pressure side and a low-pressure side;
   d. providing a first split in said main discharge line;
   e. providing an auxiliary discharge line connecting said high-pressure side of said auxiliary compressor to said first split;
   f. providing a first flow control valve in said auxiliary discharge line, wherein said first flow control valve is able to regulate flow in said auxiliary discharge line;
   g. providing a second split in said main suction line;
   h. providing an auxiliary suction line connecting said low-pressure side of said auxiliary compressor to said second split;
   i. providing a second flow control valve in said auxiliary suction line, wherein said second flow control valve is able to regulate flow in said auxiliary suction line;
   j. selectively connecting said at least one auxiliary battery to said auxiliary compressor in order to energize said auxiliary compressor, so that said auxiliary compressor,
      i. forces pressurized refrigerant through said auxiliary discharge line, through said first flow control valve, and through said first split into said main refrigerant loop,
      ii. retrieves expanded refrigerant from said main refrigerant loop, through said second split, through said second flow control valve and through said auxiliary suction line, and
      iii. whereby said auxiliary compressor drives refrigerant through said main refrigerant loop and provides cooling to said motor vehicle even when said internal combustion engine is not running.

2. The method of reducing idle-time for a motor vehicle as recited in claim 1, further comprising:
   a. providing a radio;
   b. providing emergency lights; and
   c. while said auxiliary compressor is running, using said at least one auxiliary battery to provide power to said radio and said emergency lights.

3. The method of reducing idle-time for a motor vehicle as recited in claim 1, further comprising providing a low idle-time controller capable of automatically switching on and off said auxiliary compressor in order to maintain a desired cabin temperature.

4. The method of reducing idle-time for a motor vehicle as recited in claim 3, further comprising:
   a, providing an auxiliary control panel; and
   b. wherein a user is able to enter said desired cabin temperature using said auxiliary control panel.

5. The method of reducing idle-time for a motor vehicle as recited in claim 1, further comprising providing a low idle-time controller, wherein said low idle-time controller monitors said at least one auxiliary battery and switches off said auxiliary compressor when said at least one auxiliary battery falls below a defined voltage level.

6. The method of reducing idle-time for a motor vehicle as recited in claim 5, wherein said low idle-time controller provides an alert signal when said at least one auxiliary battery falls below said defined voltage level.

7. The method of reducing idle-time for a motor vehicle as recited in claim 1, wherein:
   a. said first flow control valve is a check valve permitting flow from said auxiliary compressor toward said first split, but prohibiting flow in the opposite direction; and
   b. said second flow control valve is a check valve permitting flow from said second split toward said auxiliary compressor, but prohibiting flow in the opposite direction.

8. The method of reducing idle-time for a motor vehicle as recited in claim 1, wherein:
   a. said first flow control valve is an electrically activated valve; and
   b. said second flow control valve is an electrically activated valve.

9. The method of reducing idle-time for a motor vehicle as recited in claim 5, wherein:
   a. said first flow control valve is an electrically activated valve under the control of said low idle-time controller; and
   b. said second flow control valve is an electrically activated valve under the control of said low-idle-time controller.

10. The method of reducing idle-time for a motor vehicle as recited in claim 9, wherein:
    a. said first flow control valve further comprises a check valve; and
    b. said second flow control valve further comprises a check valve.

11. A method of reducing idle-time for a motor vehicle, comprising:
   a. providing a main air-conditioning system for circulating a refrigerant through a main refrigerant loop, said main refrigerant loop including,
      i. a main compressor having a high-pressure side and a low-pressure side, said main compressor being driven by an internal combustion engine in said motor vehicle,
      ii. a condenser,
      iii. an expansion valve,
      iv. an evaporator,
      v. a main discharge line, connecting said high-pressure side of said compressor to said condenser, and
      vi. a main suction line, connecting said low-pressure side of said main compressor to said evaporator;
   b. providing at least one auxiliary battery;
   c. providing an auxiliary compressor having a high-pressure side and a low-pressure side;
   d. providing a first split in said main discharge line;
   e. providing an auxiliary discharge line connecting said high-pressure side of said auxiliary compressor to said first split;
   f. wherein said main compressor permits flow from said main suction line to said main discharge line, but prevents flow in the opposite direction;
   g. providing a second split in said main suction line;
   h. providing an auxiliary suction line connecting said low-pressure side of said auxiliary compressor to said second split;
   i. wherein said auxiliary compressor permits flow from said auxiliary suction line to said auxiliary discharge line, but prevents flow in the opposite direction;
   j. selectively connecting said at least one auxiliary battery to said auxiliary compressor in order to energize said auxiliary compressor, so that said auxiliary compressor,
      i. forces pressurized refrigerant through said auxiliary discharge line, through said first flow control valve, and through said first split into said main refrigerant loop,
      ii. retrieves expanded refrigerant from said main refrigerant loop, through said second split, through said second flow control valve and through said auxiliary suction line, and
      iii. whereby said auxiliary compressor drives refrigerant through said main refrigerant loop and provides cooling to said motor vehicle even when said internal combustion engine is not running.

12. The method of reducing idle-time for a motor vehicle as recited in claim 11, further comprising:
   a. providing a radio;
   b. providing emergency lights; and
   c. while said auxiliary compressor is running, using said at least one auxiliary battery to provide power to said radio and said emergency lights.

13. The method of reducing idle-time for a motor vehicle as recited in claim 11, further comprising providing a low idle-time controller capable of automatically switching on and off said auxiliary compressor in order to maintain a desired cabin temperature.

14. The method of reducing idle-time for a motor vehicle as recited in claim 13, further comprising:
   a. providing an auxiliary control panel; and
   b. wherein a user is able to enter said desired cabin temperature using said auxiliary control panel.

15. The method of reducing idle-time for a motor vehicle as recited in claim 11, further comprising providing a low idle-time controller, wherein said low idle-time controller monitors said at least one auxiliary battery and switches off said auxiliary compressor when said at least one auxiliary battery falls below a defined voltage level.

16. The method of reducing idle-time for a motor vehicle as recited in claim 15, wherein said low idle-time controller provides an alert signal when said at least one auxiliary battery falls below said defined voltage level.

17. The method of reducing idle-time for a motor vehicle as recited in claim 1, further comprising:
   a. providing a first check valve permitting flow from said auxiliary compressor toward said first split, but prohibiting flow in the opposite direction; and
   b. providing a second check valve permitting flow from said second split toward said auxiliary compressor, but prohibiting flow in the opposite direction.

18. The method of reducing idle-time for a motor vehicle as recited in claim 11, further comprising:
   a. providing an electrically-activated first flow control valve in said auxiliary discharge line; and
   b. providing an electrically-activated second flow control valve in said auxiliary suction line.

19. The method of reducing idle-time for a motor vehicle as recited in claim 18, wherein:
   a. said first flow control valve is an electrically activated valve under the control of said low idle-time controller; and
   b. said second flow control valve is an electrically activated valve under the control of said low-idle-time controller.

20. The method of reducing idle-time for a motor vehicle as recited in claim 19, wherein:
   a. said first flow control valve further comprises a check valve; and
   b. said second flow control valve further comprises a check valve.

* * * * *